(12) United States Patent  
Gauvin (10) Patent No.: US 8,805,996 B1  
(45) Date of Patent: Aug. 12, 2014

(54) ANALYSIS OF COMMUNICATIONS IN SOCIAL NETWORKS

(75) Inventor: William Gauvin, Leominster, MA (US)

(73) Assignee: Symantec Corporation, Mountain View, CA (US)

( * ) Notice: Subject to any disclaimer, the term of this patent is extended or adjusted under 35 U.S.C. 154(b) by 647 days.

(21) Appl. No.: 12/705,424

(22) Filed: Feb. 12, 2010

Related U.S. Application Data

(60) Provisional application No. 61/154,662, filed on Feb. 23, 2009.

(51) Int. Cl.
*G06F 15/16* (2006.01)

(52) U.S. Cl.
USPC ........... 709/224; 709/204; 709/205; 709/206; 709/207

(58) Field of Classification Search
USPC .......................................................... 709/224
See application file for complete search history.

(56) References Cited

U.S. PATENT DOCUMENTS

| | | | |
|---|---|---|---|
| 6,782,510 B1 * | 8/2004 | Gross et al. | 715/257 |
| 7,707,252 B1 * | 4/2010 | Harris | 709/206 |
| 2001/0021931 A1 | 9/2001 | Vaughan | |
| 2003/0217106 A1 * | 11/2003 | Adar et al. | 709/206 |
| 2006/0042483 A1 | 3/2006 | Work et al. | |
| 2006/0136374 A1 | 6/2006 | Shelest et al. | |
| 2008/0294624 A1 | 11/2008 | Kanigsberg et al. | |
| 2009/0222551 A1 * | 9/2009 | Neely et al. | 709/224 |

FOREIGN PATENT DOCUMENTS

WO    WO 2008148819 A2 * 12/2008

OTHER PUBLICATIONS

Gauvin, W., "Design of a Social Networking Analysis and Information Logger Tool," WASA, Aug. 2009, 6 pages.
Gauvin, W. et al., "Measurement and Gender-Specific Analysis of User Publishing Characteristics on MySpace," Submitted to IEEE, May 2010, pp. 1-7.
Gauvin, W. et al., "Utopia Providing Trusted Social Network Relationships within an Un-Trusted Environment," Submitted to DOJ, Jun. 2009, pp. 1-10.
Ribeiro, B. et al., "On MySpace Account Spans and Double Pareto-Like Distribution of Friends," Technical Report UM-CS-2010-001, UMass Amherst, Jan. 2010, pp. 1-7.
Gauvin, W. et al., "Classification of Commercial and Personal Profiles on MySpace," IEEE International Conference, Mar. 21-25, 2011, [Online] Can Be Retrieved at<URL:http://www.cs.uml.edu/~bliu/pub/MySpaceAvatar-SESOC2011-Final.pdf>.

* cited by examiner

*Primary Examiner* — Glenton B Burgess
*Assistant Examiner* — Angela Nguyen
(74) *Attorney, Agent, or Firm* — Fenwick & West LLP (57) ABSTRACT

A communication in a social network involving a social networking profile is detected. One or more catalogs are applied to the communication. Each catalog is associated with an attribute and applying a catalog to the communication produces a catalog score measuring an appropriateness of the associated attribute in the communication. The one or more catalog scores of the one or more catalogs applied to the communication are combined to produce a communication score measuring an appropriateness of the communication. Based on the communication score, a determination is made on whether to issue an alert.

20 Claims, 4 Drawing Sheets

ANALYSIS OF COMMUNICATIONS IN SOCIAL NETWORKS

CROSS-REFERENCE TO RELATED APPLICATIONS

This application claims the benefit of U.S. Provisional Application No. 61/154,662, filed Feb. 23, 2009, which is hereby incorporated herein by reference. This application is related to U.S. patent application Ser. No. 12/705,466, filed Feb. 12, 2010, titled "Reputation of Social Networking Profiles," which is hereby incorporated herein by reference.

BACKGROUND OF THE INVENTION

1. Field of the Invention

This invention pertains in general to social networking websites, and more specifically to determining the appropriateness of communication in a social network.

2. Description of the Related Art

Social networking services have opened up many new avenues to building social networks by allowing users to share information online and connect with a wide range of different users. Social networking services, such as FACEBOOK®, MYSPACE®, and LINKEDIN®, maintain profiles created by users of the service. A user's profile allows other users of the service to learn about the user. A user's profile includes, for example, information about the user, pictures posted by the user, a listing of the user's friends, and comments posted by the user and the user's friends. The amount and types of information that can be shared in these social networking services is vast.

Social networking services allow users to communicate with other users about any topic. Social networking services do not validate the appropriateness of the content included in communications between users. Some users take advantage of this lack of validation to plan events or activities that are illegal or not allowed by a supervisor (e.g., a parent). For example, an underage teenager can use the social networking service to plan a party with alcohol.

Further, malicious entities take advantage of the lack of validation by using the social networking services to obtain personal information from users. For example, a malicious entity can deceive users into believing it is a trustworthy entity and have users provide their credit card numbers, social security numbers, and/or passwords. Accordingly, there is a need in the art for ways to determine the appropriateness of communications within social networking services.

BRIEF SUMMARY OF THE INVENTION

The above and other needs are met by a computer-implemented method, a computer program product, and a computer system for analyzing communications in a social network. Embodiments of the method comprise detecting a communication in the social network involving a social networking profile. One or more catalogs are applied to the communication. Each catalog is associated with an attribute and applying a catalog to the communication produces a catalog score measuring an appropriateness of the associated attribute in the communication. The one or more catalog scores of the one or more catalogs applied to the communication are combined to produce a communication score measuring an appropriateness of the communication. Based on the communication score, a determination is made on whether to issue an alert.

Embodiments of the computer program product have a computer-readable storage medium having computer-executable code. The computer-executable code comprises a monitoring module configured to detect a communication in a social network involving a social networking profile. The computer-executable code further comprises a catalog module configured to apply one or more catalogs to the communication, each catalog associated with an attribute and producing a catalog score measuring an appropriateness of the associated attribute in the communication. The catalog module is further configured to combine the one or more catalog scores of the one or more catalogs applied to the communication to produce a communication score measuring an appropriateness of the communication. The computer-executable code further comprises an alert module configured to determine whether to issue an alert based on the communication score.

Embodiments of the computer system comprise a computer processor and a computer-readable storage medium storing computer program modules configured to execute on the computer processor. The computer program modules comprise a monitoring module configured to detect a communication in the social network involving a social networking profile. The computer program modules further comprise a catalog module configured to apply one or more catalogs to the communication, each catalog associated with an attribute and producing a catalog score measuring an appropriateness of the associated attribute in the communication. The catalog module is further configured to combine the one or more catalog scores of the one or more catalogs applied to the communication to produce a communication score measuring an appropriateness of the communication. The computer program modules further comprise an alert module configured to determine whether to issue an alert based on the communication score.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict an embodiment of the present invention for purposes of illustration only. One skilled in the art will readily recognize from the following description that alternative embodiments of the structures and methods illustrated herein may be employed without departing from the principles of the invention described herein.

DETAILED DESCRIPTION

Figure 1:
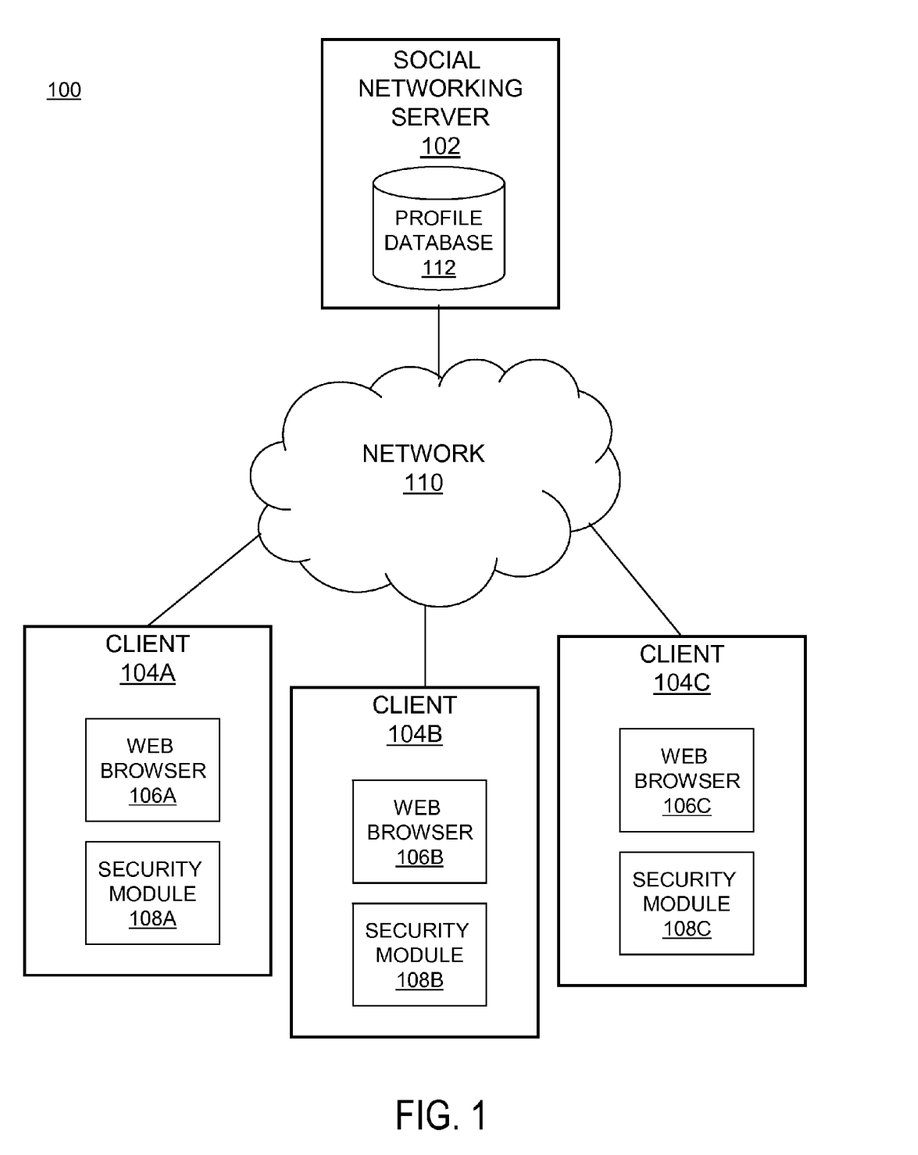
FIG. 1 is a high-level block diagram illustrating a computing environment according to one embodiment.

FIG. 1 is a high-level block diagram illustrating a computing environment 100 according to an embodiment. FIG. 1 illustrates a social networking server 102 and three clients 104 connected by a network 110. Only three clients 104 are shown in FIG. 1 in order to simplify and clarify the description. Embodiments of the computing environment 100 can have thousands or millions of clients 104 connected to the network 110.

FIG. 1 uses like reference numerals to identify like elements. A letter after a reference numeral, such as "104A," indicates that the text refers specifically to the element having that particular reference numeral. A reference numeral in the text without a following letter, such as "104," refers to any or all of the elements in the figures bearing that reference numeral (e.g. "104" in the text refers to reference numerals "104A," "104B," and/or "104C" in the figures).

In one embodiment, the social networking server 102 is located at a website provided by a social networking service (e.g., FACEBOOK®, MYSPACE®, LINKEDIN®, etc.), although the server 102 can also be provided by another entity. The social networking server 102 includes a profile database 112 that stores profiles created by users of the social networking service.

The social networking server 102 allows clients 104 to access profiles stored in the profile database 112. Upon receiving a request from a client 104 to access a selected profile, the social networking server 102 identifies the profile in the profile database 112, and transmits the profile to the client via the network 110 for presentation at the client. In one embodiment, the social networking server 102 requires that a user at a client 104 sign into the social networking service prior to allowing the client 104 to access profiles.

The clients 104 are computers or other electronic devices used by one or more users to interact with the social networking server 102 and other entities on the network 110. The clients 104, for example, can be personal computers. In other embodiments, a client 104 is a network-capable device other than a computer, such as a personal digital assistant (PDA), a mobile telephone, a pager, a television "set-top box," etc. The client 104 preferably execute an operating system (e.g., LINUX® or one of the versions of MICROSOFT WINDOWS®), which controls the operation of the client 104, and executes one or more application programs.

Each client 104 executes a web browser 106 (e.g., MICROSOFT INTERNET EXPLORER®, MOZILLA FIREFOX®) and a security module 108. The web browser 106 allows users of the client 104 to browse and search for information available on the websites of servers coupled to the network 110. Specifically, the web browser 106 allows users of the client 104 to access profiles stored in the profile database 112. Further, the web browser 106 allows users of the client 104 to interact with the social networking server 102 to communicate with other users of the social networking service.

In one embodiment, the security module 108 is integrated into the web browser 106 as a plug-in or browser helper object. In one embodiment, the security module 108 is separate from the web browser 106. In another embodiment, the security module 108 is integrated into the social networking server 102. One or more of the functions of the security module 108 can be provided by a cloud computing environment. As used herein, cloud computing refers to a style of computing in which dynamically scalable and often virtualized resources are provided as a service over the network 110.

The security module 108 analyzes communications within the social networking service of the social networking server 102 to determine the appropriateness of the communications sent and/or received by the users of the service. A communication is considered to be inappropriate if the communication has characteristics that a supervisor does not desire to be associated with communications involving supervised users of the service. The supervisor may be, for example, a parent of a child that is using the client 104 or a system administrator supervising an employee using the client.

To this end, the security module 108 identifies a focal profile. A focal profile is a profile in the profile database 112 for which the security module 108 determines the appropriateness of communications involving the profile. In one embodiment, when a user of the client 104 signs into the social networking service, the security module 104 identifies the user's profile as the focal profile.

The security module 108 monitors for communications involving the focal profile. In one embodiment, the security module 108 monitors for communications within the social networking service sent to the focal profile user or sent by the focal profile user (i.e., the user for whom focal profile was created). The types of monitored communications may include, for example, messages, emails, postings, and entries in a chat window. A posting is the sharing of content by a user of the social networking service on another user's profile. A posting is also referred to as a "comment" or a "wall posting." The user posting on another user's profile is referred to as a "publisher."

If a communication is detected, the security module 108 applies one or more catalogs to the communication. Each catalog is associated with an attribute and, when applied, derives a catalog score that represents the appropriateness of the attribute in the communication. For example, one catalog, the activity catalog, is applied by the security module 108 to determine the appropriateness of an activity referenced in the communication. If it is determined, for example, that the activity of the communication involves smoking cigarettes, the resulting catalog score may reflect that this activity is inappropriate.

The security module 108 calculates a communication score which reflects the overall appropriateness of the communication. The communication score is derived from the catalog scores of the catalogs applied to the communication. The security module 108 may adjust the communication score based on various other factors, such as the direction of the communication (e.g., whether the communication was sent or received by the user of the focal profile), the rights given to the user of the focal profile by the supervisor, and the reputation of the other profile involved in the communication.

The security module 108 determines whether to issue an alert based on the communication score. In one embodiment, the supervisor assigns a level of trust to the user that describes how much the supervisor trusts the user to not engage in inappropriate behavior. The security module 108 evaluates the communication score in view of the assigned trust level and determines whether to issue an alert. Generally, the lower the trust level, the lower the measure of inappropriateness in the communication score that results in the security module 108 generating an alert. And, conversely, the higher the trust level, the higher the measure of inappropriateness in the communication score that results in the security module 1108 generating an alert. The alert notifies the supervisor that the user has been involved in an inappropriate communication and may provide additional information, such as a copy of the communication and/or the identities of the parties involved in the communication.

The network 110 enables communications among the entities connected to it. In one embodiment, the network 110 is the Internet and uses standard communications technologies and/or protocols. Thus, the network 110 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 110 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 110 can be represented using technologies and/or formats including the hypertext markup language (HTML), the extensible markup language (XML), etc. In addition, all or some of links can be encrypted using conventional encryption technologies such as the secure sockets layer (SSL), transport layer security (TLS), virtual private networks (VPNs), Internet Protocol security (IPsec), etc. In another embodiment, the entities use custom and/or dedicated data communications technologies instead of, or in addition to, the ones described above.

Figure 2:
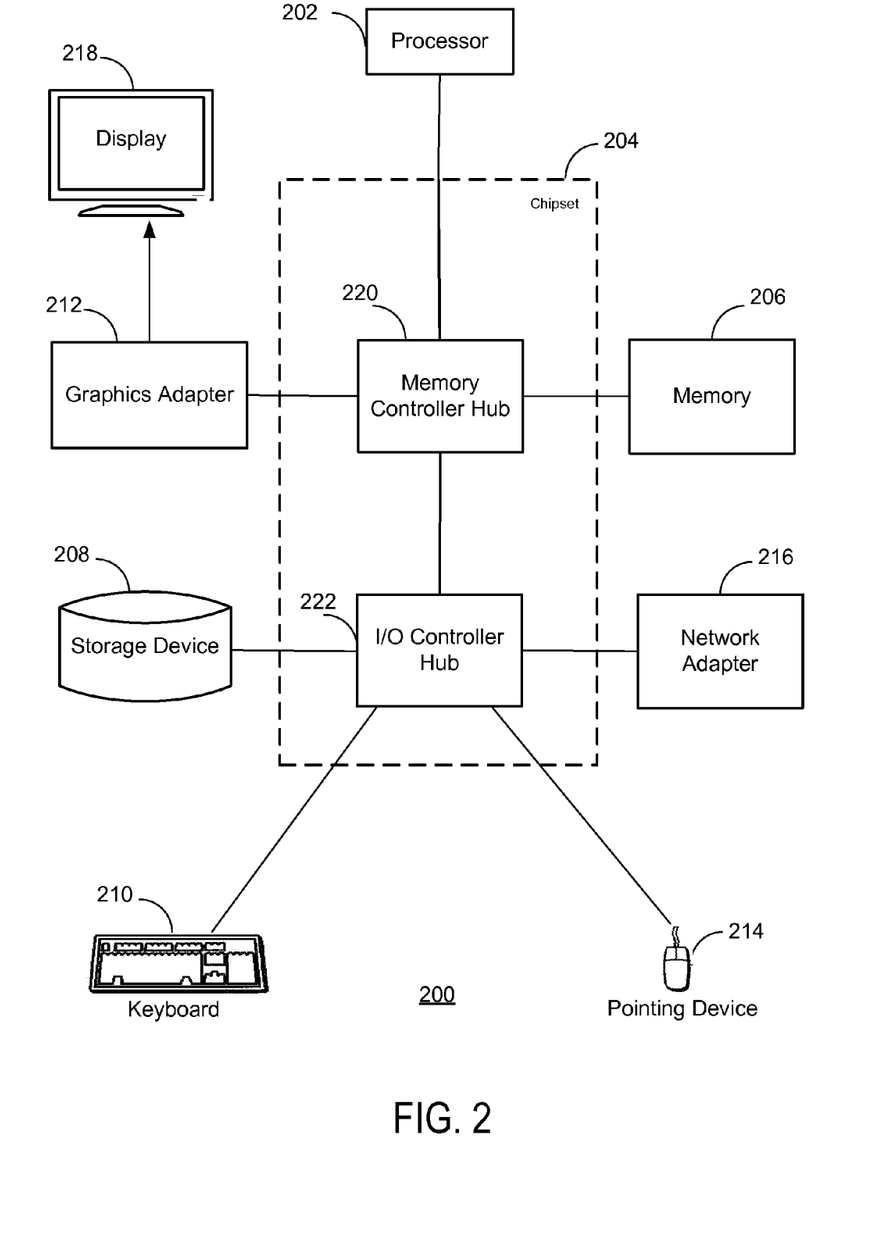
FIG. 2 is a high-level block diagram illustrating an example of a computer for use as the social networking server and/or a client.

FIG. 2 is a high-level block diagram illustrating an example of a computer 200 for use as the social networking server 102 and/or a client 104. Illustrated are at least one processor 202 coupled to a chipset 204. The chipset 204 includes a memory controller hub 220 and an input/output (I/O) controller hub 222. A memory 206 and a graphics adapter 212 are coupled to the memory controller hub 220, and a display device 218 is coupled to the graphics adapter 212. A storage device 208, keyboard 210, pointing device 214, and network adapter 216 are coupled to the I/O controller hub 222. Other embodiments of the computer 200 have different architectures. For example, the memory 206 is directly coupled to the processor 202 in some embodiments.

The storage device 208 is a non-transitory computer-readable storage medium such as a hard drive, compact disk read-only memory (CD-ROM), DVD, or a solid-state memory device. The memory 206 holds instructions and data used by the processor 202. The pointing device 214 is a mouse, track ball, or other type of pointing device, and is used in combination with the keyboard 210 to input data into the computer system 200. The graphics adapter 212 displays images and other information on the display device 218. The network adapter 216 couples the computer system 200 to the network 110. Some embodiments of the computer 200 have different and/or other components than those shown in FIG. 2.

The computer 200 is adapted to execute computer program modules for providing functionality described herein. As used herein, the term "module" refers to computer program instructions and other logic used to provide the specified functionality. Thus, a module can be implemented in hardware, firmware, and/or software. In one embodiment, program modules formed of executable computer program instructions are stored on the storage device 208, loaded into the memory 206, and executed by the processor 202.

The types of computers 200 used by the entities of FIG. 1 can vary depending upon the embodiment and the processing power used by the entity. For example, a client 104 that is a mobile telephone typically has limited processing power, a small display 218, and might lack a pointing device 214. The social networking server 102, in contrast, may comprise multiple blade servers working together to provide the functionality described herein.

Figure 3:
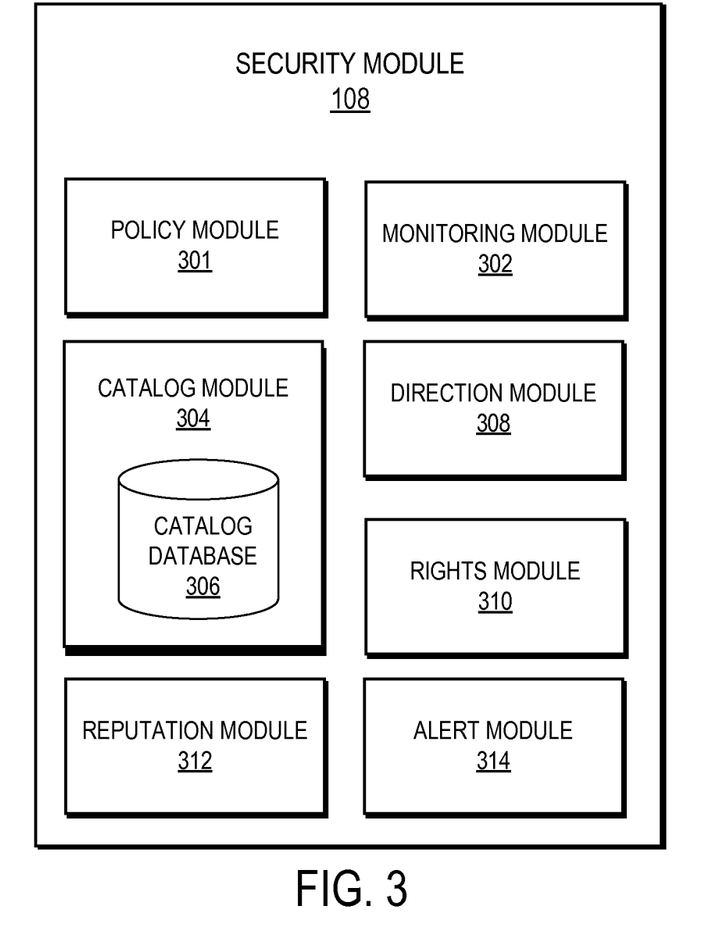
FIG. 3 is a high-level block diagram illustrating a detailed view of the security module of a client according to one embodiment.

FIG. 3 is a high-level block diagram illustrating a detailed view of the security module 108 of a client 104 according to one embodiment. As shown in FIG. 3, the security module 108 includes a policy module 301, a monitoring module 302, a catalog module 304, a direction module 308, a rights module 310, a reputation module 312, and an alert module 314.

Those of skill in the art will recognize that other embodiments of the security module 108 can have different and/or other modules than the ones described here, and that the functionalities can be distributed among the modules in a different manner.

The policy module 301 allows the supervisor to specify a security policy involving the social networking service. In general, the security policy describes the one or more users to monitor, the types of communications to monitor, and which catalogs to apply to the communications. For example, a supervisor who is a parent can use the policy module 301 to identify the child or children to monitor and the types of monitoring to perform. The security policy also describes a rights policy that specifies restrictions on how and when the user can use the social networking service. Moreover, the security policy specifies the level of trust that the supervisor gives the user. Depending upon the embodiment, the supervisor can specify the security policy by accessing the client 104 on which the security module 108 is located, by accessing a network-based site that communicates with the security module 108 of the client, by accessing confirmation settings on the social networking server 102 that are relayed to the security module 108, etc.

The monitoring module 302 monitors for communications within the social networking service of the social networking server 102 involving a focal profile (i.e., the profile of a user that is to be monitored according to the security policy). In one embodiment, when a user of the client 104 signs into the social networking service, the monitoring module 302 determines whether the signed-into profile is to be monitored according to the security policy. If the signed-into profile is to be monitored, the monitoring module 302 establishes this profile as the focal profile and performs monitoring and other functions as described below. If the profile is not to be monitored, the monitoring module 302 suspends operations until a sign-in to a different profile is detected.

An embodiment of the monitoring module 302 monitors for communications within the social networking service sent to the focal profile user by a member of a group or sent by the focal profile user to a member of the group. In one embodiment, the group is specified in the security policy and can include, for example, all users of the social networking service, users who are peers of the focal profile user (measured, e.g., by age or affiliation), and/or users who are not peers of the focal profile user. If a monitored-for communication is detected, the monitoring module 302 flags the communication so that a determination can be made as to whether it is appropriate.

The catalog module 304 analyzes communications to determine whether the communications are appropriate. The catalog module 304 applies one or more catalogs to a communication flagged by the monitoring module 302. As discussed above, each catalog is associated with an attribute. Moreover, the application of a catalog to a communication results in a catalog score representing the appropriateness of the associated attribute in the communication. In one embodiment, the specific catalogs to apply to a communication are specified in the security policy.

The catalog module 304 includes a catalog database 306 that includes catalogs that can be applied to communications. In one embodiment, a catalog includes a list of character strings that are representative of the attribute of the catalog. A character string included in a catalog may be, for example, a linguistic term, a string of numbers, or a combination of numbers and symbols. A character string can also be specified using regular expressions, wildcards, and other similar techniques. A weight is associated with each string included in the catalog. The weight value of a string is a measurement of how appropriate it is for the string to be included in a communication with respect to the associated attribute.

Shown below is an example of an activity catalog applied to calculate a catalog score that is representative of the appropriateness of the activity referenced in a communication. As can be seen, the catalog includes linguistic terms of activities. In the example below, the more positive a weight, the more inappropriate the activity associated with the weight. Further, the more negative a weight, the more appropriate the activity associated with the weight.

| String | Weight |
| --- | --- |
| "birthday" | −40 |
| "bday" | −40 |
| "b-day" | −40 |
| "sex" | 50 |
| "graduation" | −40 |
| "prom" | −40 |
| "vacation" | −40 |
| "fight" | 50 |
| "movie" | 0 |
| "trip" | −20 |
| "entertainment" | 10 |
| "show" | 10 |
| "dance" | 15 |
| "detention" | 40 |
| "shop" | 0 |
| "shopping" | 0 |
| "license" | 10 |
| "stopped" | 40 |
| "pulled over" | 40 |
| "ticket" | 40 |
| "christmas" | −40 |
| "xmas" | −40 |
| "halloween" | −40 |
| "thanksgiving" | −40 |
| "easter" | −40 |
| "valentine" | −40 |
| "good friday" | −40 |

In one embodiment, the character strings and weights included in each catalog are preset by the entity that provides the security module 108. However, a supervisor may also edit the character strings included in a catalog and the weights associated with the strings. For example, assume that a daughter has been grounded by her parents and cannot go shopping. The parents may edit the activity catalog to associate high positive weights with the strings "shop" and "shopping" (thereby indicating that these activities are very inappropriate). The supervisor can edit the catalogs when specifying the security policy or at a later time.

In one embodiment, the catalogs in the catalog database 306 include an activity catalog, an event catalog, a location catalog, a mood catalog, a timeframe catalog, and a personal information catalog. As described above the activity catalog is applied to measure the appropriateness of the activity referenced in a communication. The event catalog is applied to measure the appropriateness of an event referenced in a communication and includes character strings related to events. For example, character strings in the event catalog may include "detention," "party," "graduation," "birthday," "reunion," "prom," and "game."

The location catalog is applied to measure the appropriateness of a location where an activity or event referenced in a communication is taking place. The character strings included in the location catalog relate to different locations. For example, character strings in the location catalog may include "home," "school," "church," "bar," "jail," and "prison." The mood catalog is applied to measure the overall mood of the communication. Examples of character strings that may be in the mood catalog include "happy," "sad," "excited," "mad," "devastated," "bitter," and "jealous."

The timeframe catalog is applied to measure the appropriateness of the timeframe of the activity or event referenced in a communication. The character strings included in the timeframe catalog relate to time. Examples of character strings that may be in the timeframe catalog include "yesterday," "last night," "today," "tomorrow," and "next week." The personal information catalog is applied to determine whether a communication includes personal information and measures the appropriateness of the personal information in the communication. The character strings included in the personal information catalog relate to personal information such as phone numbers, social security numbers, age, and gender.

The catalog module 304 applies each catalog specified by the security policy to the flagged communication, thereby generating a catalog score for each applied catalog. In one embodiment, the catalog score for a catalog is the sum of the weights of the strings in the catalog that are found in the communication. For example, assume the communication being analyzed includes, "I was pulled over and given a speeding ticket." Further, assume the activity catalog is applied to the communication. The activity catalog includes the strings "pulled over" and "ticket," each having a weight of 40. In this example, the catalog score calculated by the catalog module 304 for the communication is 80.

The catalog module 304 generates a communication score for the communication based on the catalog scores of the applied catalogs. The communication score represents the overall appropriateness of the communication. In one embodiment, the catalog module 304 produces the communication score by summing the catalog scores. Thus, as can be observed from the sample weights described above, in one embodiment a higher communication score indicates a lesser amount of appropriateness.

The direction module 308 determines the directions of monitored communications and can adjust the communication score of a communication in response thereto. For example, the supervisor may consider inappropriate material in communications sent by the focal profile user to be more important and serious than such material in communications sent to the focal profile user. Therefore, the adjustment made by the direction module 308 can boost the communication score of communications sent by the focal profile user.

In one embodiment, the direction module 308 determines whether the communication was sent to the focal profile user, whether the communication was sent from the focal profile user, and/or whether there has been bidirectional communication between the focal profile user and the other party to the communication. In one embodiment, whether a communication is bidirectional depends on whether the parties involved in the communication directed messages to each other within a specific time period. Therefore, if the communication was sent to the focal profile user, the direction module 308 determines whether a prior communication was sent by the focal profile user to the other party to the communication within the specific time period and vice-versa. In one embodiment, the direction module 308 analyzes the various storage locations holding past communications, such as the user's profile, inbox, sent folder, and trash folder to determine whether a communication is bidirectional.

The direction module 308 can apply different adjustments to the communication score of a communication based on whether the communication is to the focal profile user, from the focal profile user, or bidirectional. The supervisor can set the adjustments as part of the security policy. The adjustment for a given direction can also be set to zero, i.e., no adjustment.

The rights module 310 determines whether the communication violates the rights policy specified by the supervisor and adjusts the communication score accordingly. In general, a violation of the rights policy indicates that the focal profile user is involved in a communication disapproved of by the supervisor. Therefore, the violation results in an adjustment to the score to indicate that the communication is more inappropriate. Different types of violations can result in different amounts of adjustment.

In one embodiment, the rights policy specifies restrictions on communications in which the focal profile user can engage. The restrictions can include time restrictions specifying when the focal profile user may send communications (e.g., only on certain days of the week, and only at certain times on certain days). The restrictions can also include user restrictions that limit the other profile users with which the focal profile user can communicate (e.g., can communicate with only friends, cannot communicate with user X). The restrictions can further include type restrictions that limit the types of communications in which the focal profile user may engage (e.g., can communicate via messages and profile postings, but not via chat).

The rights module 310 compares the communication to the rights policy to determine whether any of the restrictions are violated. If so, the rights module 310 adjusts the communication score. The adjustments can differ based on the specific restrictions that are violated. For example, a time restriction can result in a lesser adjustment to the score than a user restriction.

The reputation module 312 calculates a reputation score for the profile of the other user that is a part of the communication with the focal profile user and adjusts the communication score accordingly. The reputation score reflects the reputation of the profile, meaning whether the profile can be relied upon to not be a malicious profile. Malicious profiles attempt to deceive users that access the profile by, for example, pretending to be associated with a trustworthy entity. Malicious profiles typically include inaccurate information (e.g., about profile user's gender and age) and/or attempt to draw to the profile users of a specific gender (i.e., target a specific gender). Therefore, if the profile includes inaccurate information or targets a specific gender it indicates that the profile is less reliable.

In one embodiment, the reputation module 312 determines the gender and age of the other user, independent of the gender and age specified by the profile. The reputation module 312 determines gender and age based on certain characteristics of the profile, such as the content of the profile, the number of friends, and/or the ages of the profile's friends. The reputation module 312 calculates the reputation score based at least in part on whether the determined gender and age matches the gender and age specified by the profile.

In another embodiment, the reputation module 312 determines the gender being targeted by the profile. The reputation module 312 determines the gender based on certain characteristics of the profile, such as the age distribution of the profile's publishers, the content of the profile, content posted on other profiles by the profile, and/or the number of friends. The reputation module 312 calculates the reputation score based at least in part on the determined gender being target by the profile.

If the reputation module 312 determines based on the reputation score that the profile is a less reliable profile, the reputation module 312 adjusts the communication score to reflect that communication is more inappropriate. Conversely, if the reputation module 312 determines that the profile is a more reliable profile, the reputation module 312 adjusts the communication score to reflect that communication is more appropriate.

The alert module 314 determines whether to issue an alert to a supervisor based on an evaluation of the communication score of a communication against the level of trust assigned to the focal profile user by the security policy. In one embodiment, the supervisor assigns one of multiple discrete levels of trust to the focal profile user, e.g., "full trust," "some trust," "limited trust," and "no trust." Each level of trust has a communication score range associated with it. The alert module 314 module issues an alert to the supervisor if the communication score falls within the range of the trust level assigned to the focal profile user.

For example, the "full trust" level indicates that the supervisor deeply trusts the focal profile user. Therefore, the score range of the "full trust" level is set so that only an extremely inappropriate communication results in an alert being sent to the supervisor. Conversely, the "no trust" level indicates that the supervisor does not trust the focal point user. Therefore, the score range of the "no trust" level is set so that a slightly inappropriate communication results in an alert being sent to the supervisor. The other trust levels have score ranges between these two extremes of trust levels.

The alert sent by the alert module 314 may be, for example, an email, a message within the social networking service, or a text message (e.g., Short Message Service message or Multimedia Messaging Service message). The information included in the alert may vary. In one embodiment, the alert simply notifies the supervisor that the focal profile user was involved in an inappropriate communication and that the supervisor should discuss the communication with the user. In this embodiment, the alert does not include any details on the content of the communication but may include other associated information, such as the sender, receiver, date of the communication and time of the communication.

In another embodiment, the alert includes the content of the communication along with the other associated information. In a different embodiment, the alert includes a summary of the content such as the activity, event, location, mood, and timeframe involved in the communication, but not the content itself. The supervisor can select the type of alert received and the information included in the alert in the security policy.

In one embodiment, one or more of the modules described herein use fuzzy logic in performing their respective functions. Fuzzy logic used within the techniques described herein, provides a means to associate a measure with different aspects of a communication. By associating measures with different aspects of a communication an overall measurement can be derived to determine the appropriateness of a communication.

Figure 4:
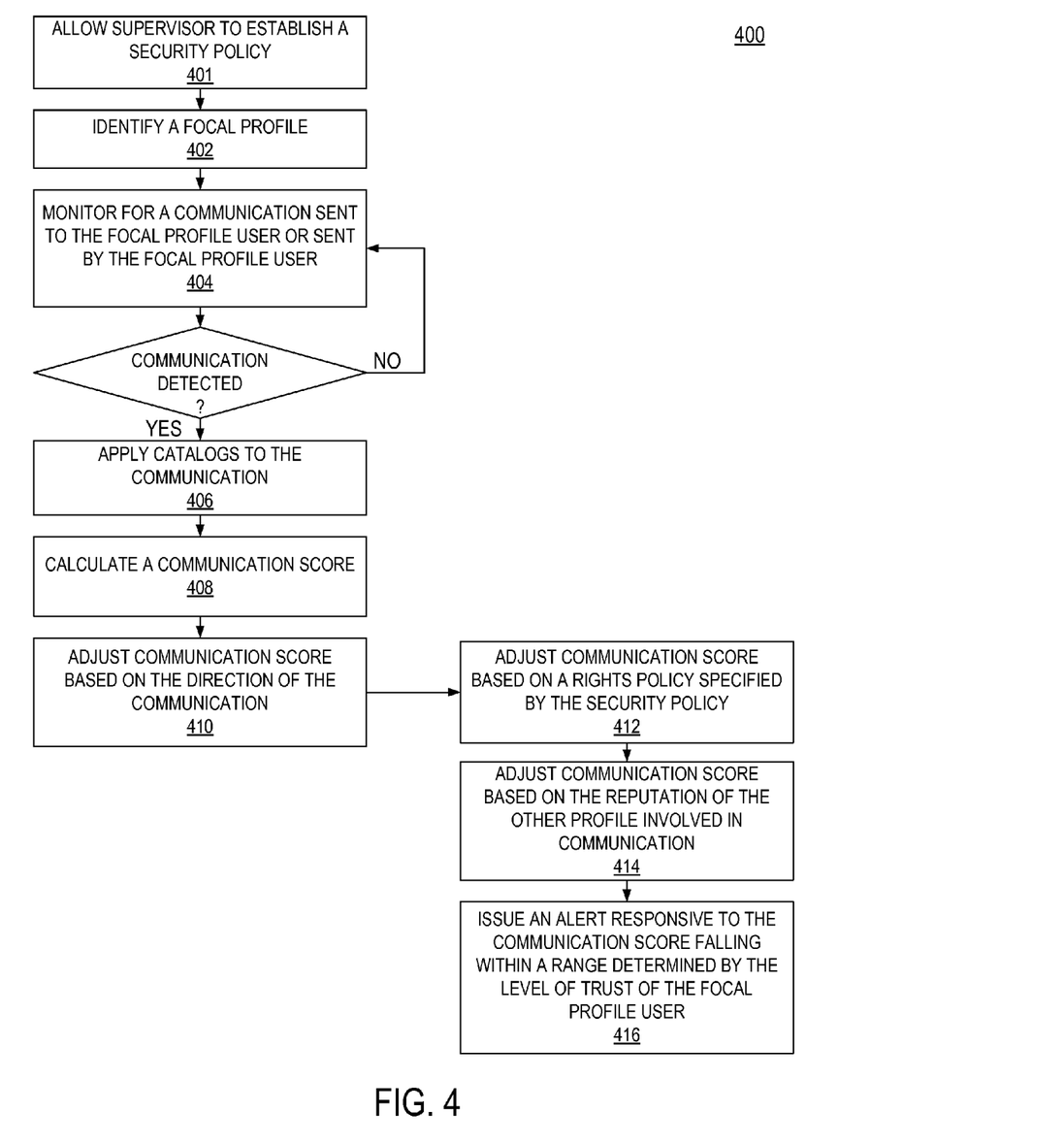
FIG. 4 is a flowchart illustrating steps performed by the security module in determining whether a communication within a social networking service is appropriate according to one embodiment.

FIG. 4 is a flowchart illustrating steps performed by the security module 108 in determining whether a communication within a social networking service is appropriate according to one embodiment. Other embodiments perform the illustrated steps in different orders, and/or perform different or additional steps. Additionally, in other embodiments, some or all of the steps may be performed by different modules.

The security module 108 allows a supervisor to establish 401 a security policy. The security module 108 identifies 402 a focal profile based on the security policy. The security module 108 monitors 404 for communications within the social networking service sent to the focal profile user or sent by the focal profile user. If a monitored-for communication is detected, the security module 108 applies 406 catalogs to the communication. The security module 108 determines the catalog to apply to the communication based on the security policy. For each catalog applied, the security module 108 calculates a catalog score. The security module 108 calculates 408 a communication score for the communication based on the catalog scores.

The security module 108 adjusts 410 the communication score based on the direction of the communication. The security module 108 further adjusts 412 the communication score based on the whether the communication violates a rights policy for the focal profile user specified by the security policy. Also, the security module 108 adjusts 414 the communication score based on the reputation of the other profile involved in the communication. The security module 108 issues 416 an alert if the communication score falls within a range determined by the level of trust assigned to the focal profile user in the security policy. The alert notifies the supervisor that the focal profile user has been involved in an inappropriate communication.

The above description is included to illustrate the operation of the embodiments and is not meant to limit the scope of the invention. The scope of the invention is to be limited only by the following claims. From the above discussion, many variations will be apparent to one skilled in the relevant art that would yet be encompassed by the spirit and scope of the invention. As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The invention claimed is:

1. A computer-implemented method for analyzing communications in a social network, the method comprising:
    detecting a communication in the social network involving a social networking profile;
    retrieving one or more catalogs, a catalog associated with an attribute, including a set of character strings related to the attribute and further including an associated weight value for each character string, each weight value describing a relationship of the associated character string to the attribute and having a polarity and a magnitude, wherein:
        the polarity indicates whether the associated character string is appropriate or inappropriate for communications having the attribute; and
        the magnitude represents a degree of the appropriateness or inappropriateness of the associated character string with respect to the attribute;
    applying the retrieved catalogs to the communication to generate one or more catalog scores, each catalog score corresponding to a retrieved catalog and generated based on the weight values associated with the character strings included in the corresponding catalog;
    combining the one or more catalog scores to produce a communication score measuring an appropriateness of the communication;
    determining whether the communication violates a rights policy specified for a user associated with the social networking profile, wherein the rights policy specifies restrictions on communications in which the user associated with the profile may engage;
    responsive to the communication violating the rights policy, adjusting the communication score based on the violation; and
    determining whether to issue an alert based on the communication score.

2. The method of claim 1, further comprising:
    determining a direction of the communication with respect to the social networking profile; and
    adjusting the communication score based on the determined direction.

3. The method of claim 1, wherein the rights policy includes time restrictions specifying days and/or times when the user of the profile can send communications.

4. The method of claim 1, further comprising:
    calculating a reputation score for an other profile involved in the communication, the reputation score providing an indication of whether the other profile is malicious; and
    adjusting the communication score based at least in part on the calculated reputation score.

5. The method of claim 1, wherein determining whether to issue an alert further comprises:
    determine a trust level for the user associated with the profile; and
    determining whether to issue an alert to a supervising user based on a comparison between the determined trust level and the communication score.

6. The method of claim 1, wherein a weight value with a negative polarity indicates that the associated character string is appropriate, and a weight value with a positive polarity indicates that the associated character string is inappropriate.

7. The method of claim 1, wherein the character strings and associated weight values are preset by a user.

8. The method of claim 1, further comprising modifying one of the weight values based on a request received from a supervising user.

9. The method of claim 1, wherein the rights policy includes user restrictions specifying other users with which the user of the profile can communicate using the social network.

10. The method of claim 1, wherein the rights policy includes user restrictions specifying other users with which the user of the profile is prohibited from communicating with using the social network.

11. The method of claim 2, wherein the direction of the communication with respect to the social networking profile is selected from a set consisting of: to a user associated with the profile; from the user associated with the profile; and bidirectional involving the user associated with the profile.

12. The method of claim 4, wherein the reputation score is calculated based on whether the other profile includes inaccurate information.

13. The method of claim 4, wherein calculating the reputation score for the other profile comprises:
    estimating a gender and an age of a user associated with the other profile based on characteristics of the other profile; and
    calculating the reputation score based on whether the estimated gender and age matches a gender and an age included in the other profile.

14. A computer program product having a non-transitory computer-readable storage medium having computer-executable code for analyzing communications in a social network, the computer-executable code comprising:
    a monitoring module configured to detect a communication in the social network involving a social networking profile;
    a catalog module configured to:
        retrieve one or more catalogs, a catalog associated with an attribute, including a set of character strings related to the attribute and further including an associated weight value for each character string, each weight value describing a relationship of the associated character string to the attribute and having a polarity and magnitude, wherein: the polarity indicates whether the associated character string is appropriate or inappropriate for communications having the attribute; and the magnitude represents a degree of the appropriateness or inappropriateness of the associated character string with respect to the attribute;

apply the retrieved catalogs to the communication to generate one or more catalog scores, each catalog score corresponding to a retrieved catalog and generated based on the weight values associated with the character strings included in the corresponding catalog; and combine the one or more catalog scores to produce a communication score measuring an appropriateness of the communication;

a rights module configured to:
determine whether the communication violates a rights policy specified for a user associated with the social networking profile, wherein the rights policy specifies restrictions on communications in which the user associated with the profile may engage; and
adjust the communication score responsive to the communication violating the rights policy; and an alert module configured to determine whether to issue an alert based on the communication score.

15. The computer program product of claim 14, further comprising a direction module configured to:
determine a direction of the communication with respect to the social networking profile; and
adjust the communication score based on the determined direction.

16. The computer program product of claim 14, further comprising a reputation module configured to:
calculate a reputation score for an other profile involved in the communication, the reputation score providing an indication of whether the other profile is malicious; and
adjust the communication score based at least in part on the calculated reputation score.

17. The computer program product of claim 14, wherein the alert module is further configured to:
determine a trust level for the user associated with the profile; and
determine whether to issue an alert to a supervising user based on a comparison between the determined trust level and the communication score.

18. A computer system for analyzing communications in a social network, the system comprising:
a computer processor; and
a non-transitory computer-readable storage medium storing computer program modules configured to execute on the computer processor, the computer program modules comprising:

a monitoring module configured to detect a communication in the social network involving a social networking profile;

a catalog module configured to:
retrieve one or more catalogs, a catalog associated with an attribute, including a set of character strings related to the attribute and further including an associated weight value for each character string, each weight value describing a relationship of the associated character string to the attribute and having a polarity and magnitude, wherein: the polarity indicates whether the associated character string is appropriate or inappropriate for communications having the attribute; and the magnitude represents a degree of the appropriateness or inappropriateness for the associated character string with respect to the attribute;

apply the retrieved catalogs to the communication to generate one or more catalog scores, each catalog score corresponding to a retrieved catalog and generated based on the weight values associated with the character strings included in the corresponding catalog; and combine the one or more catalog scores to produce a communication score measuring an appropriateness of the communication;

a rights module configured to:
determine whether the communication violates a rights policy specified for a user associated with the social networking profile, wherein the rights policy specifies restrictions on communications in which the user associated with the profile may engage; and
adjust the communication score responsive to the communication violating the rights policy; and an alert module configured to determine whether to issue an alert based on the communication score.

19. The computer system of claim 18, further comprising a reputation module configured to:
calculate a reputation score for an other profile involved in the communication, the reputation score providing an indication of whether the other profile is malicious; and
adjust the communication score based at least in part on the calculated reputation score.

20. The computer system of claim 18, wherein the alert module is further configured to:
determine a trust level for the user associated with the profile; and
determine whether to issue an alert to a supervising user based on a comparison between the determined trust level and the communication score.

* * * * *